United States Patent [19]

Oliver

[11] Patent Number: 4,550,498
[45] Date of Patent: Nov. 5, 1985

[54] REPLACEMENT SPOOL FOR ROTATING LINE VEGETATION CUTTER

[76] Inventor: Ronald A. Oliver, 8940 Tarragon Ct., Manassas, Va. 22110

[21] Appl. No.: 581,032

[22] Filed: Feb. 17, 1984

[51] Int. Cl.[4] ............................................. A01D 50/00
[52] U.S. Cl. ...................................... 30/276; 56/12.7
[58] Field of Search ................... 30/276, 347; 56/12.7, 56/294, 295; 242/118.4

[56] References Cited

U.S. PATENT DOCUMENTS

| | | | |
|---|---|---|---|
| 4,177,561 | 12/1979 | Ballas | 30/276 X |
| 4,209,902 | 7/1980 | Moore et al. | 56/12.7 X |
| 4,245,454 | 1/1981 | Zien | 30/276 X |
| 4,259,782 | 4/1981 | Proulx | 56/12.7 X |
| 4,271,595 | 6/1981 | Rahe | 56/12.7 X |

Primary Examiner—E. R. Kazenske
Assistant Examiner—Willmon Fridie, Jr.
Attorney, Agent, or Firm—Harold H. Dutton, Jr.

[57] ABSTRACT

A replacement spool for a rotating line vegetation cutter comprising a central generally cylindrical hub portion, a pair of outer flanges on the outside surface of the hub portion at the ends of the hub portion, a central flange between the outer flanges for dividing the spool into two sections for receiving line in each section, an elongated slot formed in the hub portion and extending substantially parallel to the longitudinal axis of the hub portion, the elongated slot being positioned on the hub so as to extend behind the central flange from approximately the middle of one of the sections to approximately the middle of the other section, and a length of vegetation cutting line wound on the spool in such a manner that one end of the line is wound in each of the sections and a midsection of the line lies in the slot and connects the ends of the line.

5 Claims, 4 Drawing Figures

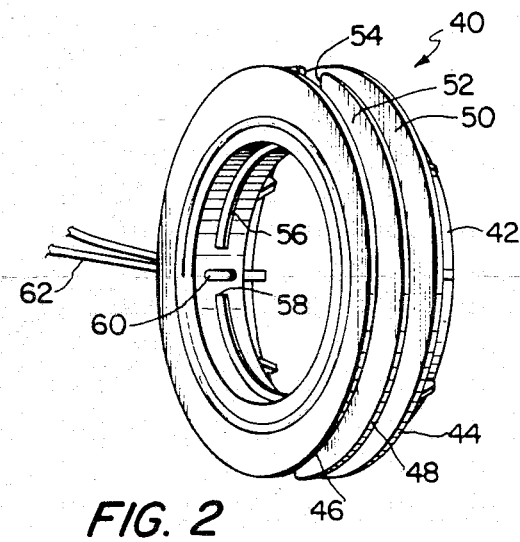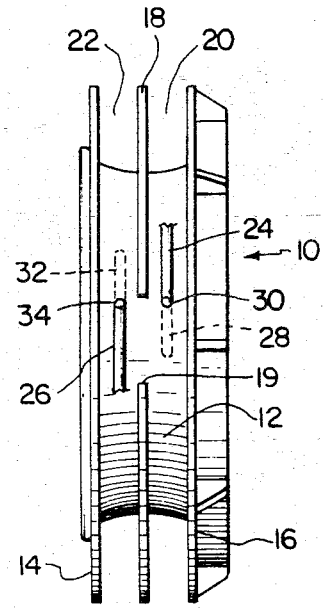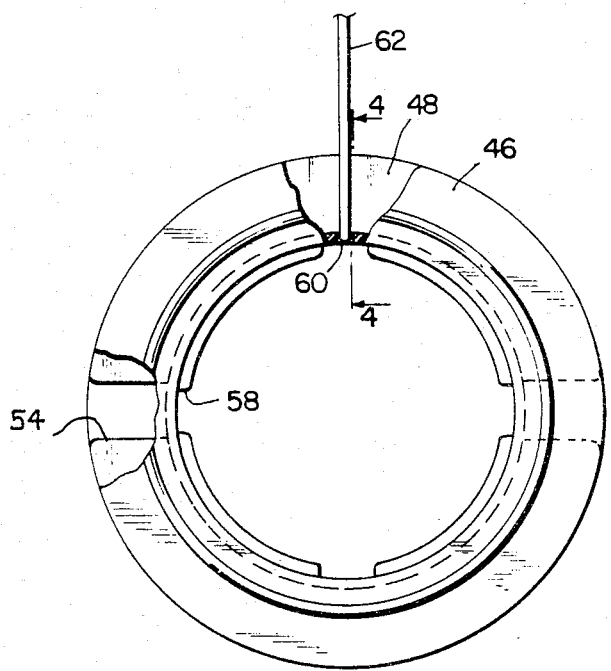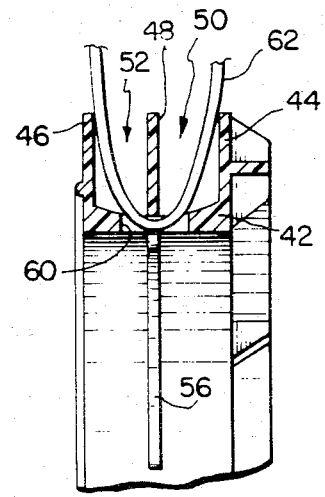

REPLACEMENT SPOOL FOR ROTATING LINE VEGETATION CUTTER

This invention relates to a replacement spool for a rotating line vegetation cutter. More particularly, this invention relates to an improved replacement spool which is particularly useful in connection with such vegetation cutters which use nylon monofilament line secured to a spool in such a manner that two ends of the line project from the spool for accomplishing the cutting action.

BACKGROUND AND OBJECTS

In recent years, nylon line type vegetation cutters or trimmers have become extremely popular with homeowners, gardeners, and persons needing to cut grass, weeds, and the like. Because of the relative safety of such devices, compared to blade type cutters, their popularity is all the greater.

In general, these devices comprise a long handle on which is mounted an engine, either gasoline or electric powered. The output of the engine is connected to a spool so as to cause the spool to rotate at a high speed.

Wound upon the spool is a nylon, monofilament line, and the end of the line projects generally radially outwardly from the spool, a distance typically on the order of 4-12 inches. As the spool, and the projecting end of the line, rotate at high speed, the line acts to "cut" any grass or other small stalk vegetation which it encounters. Since the line is neither sharp nor rigid, as in the case of a blade, should it encounter any obstruction such as a larger tree or stalk, concrete walkways, shoes, or the like, the line simply passes by the obstruction without significant damage to either the engine or the tool, or the obstruction itself.

However, the line is eventually worn or broken both by the "cutting" action and by contact with such obstructions, and these types of tools are provided with means for automatically releasing an additional length of line from the spool so the cutting or trimming work can continue uninterrupted.

Over a period of time, the line is used up and is usually replaced, either by replacing an empty spool with a new one or by rewinding new line onto the old spool.

In many of the more powerful cutters of this type, the line is wound on such a spool so that two ends of line are available for the cutting action, the two ends projecting radially in diametrically opposed directions. In such cases, the cutter is even more efficient. Generally, however, this type of tool uses a more powerful motor since the required rotational force is greater.

In the past, the fully wound replacement spools for such vegetation cutters tend to be considerably more expensive than the line itself. As a result, many users prefer to simply buy the line in bulk form and rewind it onto their own spools. This is particularly true in the case of commercial use of this equipment. However, the spools presently available tend to increase the amount of line wasted by the user.

For example, both in the case of the single and double end trimmers, the replacement line ends are simply inserted into holes in the hub of the spool and then the line is wound around the hub. The bend in the line, as it emerges from the hole and turns approximately 90° to wind around the spool provides adequate restraint to keep the line from being pulled out of the hole when additional turns of line are wound over the first layer of line on the hub of the spool.

However, as the amount of line remaining on the spool becomes shorter and shorter during use, there is less and less force holding the line end or ends in the holes in the hub, and eventually the forces acting on the line will cause it to come out of the hole or holes. While the length of line remaining when the end comes out of the holes will vary to some extent, this amount can represent a significant waste, particularly for commercial users of such equipment. Often, two feet or more of line is wasted for each line on the spool, or a total of at least four feet in the case of spools with two projecting line ends.

Some effort in the past has been made to overcome this drawback, such as shown in U.S. Pat. No. 4,195,408 issued to Palmieri et al, wherein a single length of line is doubled and the two ends are passed outwardly from the central opening of the hub so as to leave a U-shaped loop on the interior of the hub. However, the mere provision of two closely spaced holes in this manner leaves a weak spot between the two holes. Since most spools of this type are molded from plastic material, this weak point may be easily broken, so that the spool becomes useless.

In addition, because of the tight bend in the line at the loop, the line itself may be weakened at the bend. Further, the line usually is rather thick, on the order of 1-1.5 mm, and because of this thickness, it cannot be bent very tightly and thus projects into the central opening of the hub. In turn, this tends to interfere with the mounting of the spool on the clutch.

Accordingly, a primary object of the present invention is to provide a replacement spool for nylon line type vegetation trimmers which overcomes the disadvantages of prior art spools.

Another object of this invention is to provide a replacement spool for such vegetation cutters which enables use of the line down to the point where only a short, essentially unusable length of such line remains on the spool.

Still a further object of this invention is to provide a replacement spool for line vegetation cutters which is of greater strength at the line attachment point than in the prior art.

Yet another object of the present invention is to provide an improved replacement spool which may be readily used with many existing vegetation cutters.

These and other objects and advantages of this invention will become apparent upon consideration of the following specification and claims when taken together with the accompanying drawings.

DESCRIPTION OF THE DRAWINGS

FIG. 1 is a side view of a line spool typical of the type found in prior art;

FIG. 2 is a perspective view of a line spool;

FIG. 3 is a front plan view of a line spool according to the present invention, with portions broken away for clarity; and FIG. 4 is a section view along lines 4—4 of FIG. 3 and viewed in the direction of the arrows.

BRIEF DESCRIPTION OF THE INVENTION

The replacement spool according to the present invention essentially comprises a generally cylindrical, central hub portion and a pair of outer flanges extending from the hub. A central rib or flange is provided between the two outer flanges both for strengthening the spool and for separating the windings of line which may then be wound in opposite directions on the spool as is necessary on some cutters. This divides the spool into two separate sections on which the line is wound.

Usually, the central flange is discontinuous around the hub, having one or more gaps. The central flange may extend radially as far as the outer flanges, or may be of a slightly lesser diameter than the outer flanges.

Formed in the hub at a location behind the central flange is one or more elongated slots. Each slot is of a length greater than the thickness of the central flange so as to terminate approximately in the midpoint of the two sections. The slots are of a width essentially the same as the diameter of the line to be used.

In this manner, the line to be used may be doubled and the two ends inserted into one of the slots with one end on each side of the central flange. Then, the line ends are wound around the spool in the usual manner. The central flange, because of its diameter, provides the strength needed for retaining the line on the spool.

In addition, the slot in which the line rests allows the line to be recessed into the inside diameter of the hub so as not to interfere with the clutch on which the spool is mounted. Further, because the slot is approximately the same width as the line diameter, the line tends to snap into place, improving the line retention ability.

As a result, the line wound on my new replacement spool may be used down to the point where only about four inches or less of line, the minimum effective cutting length, remains on the spool, thereby reducing the cost of line waste tremendously, as well as increasing the time between rewinding of the spool.

DESCRIPTION OF THE PREFERRED EMBODIMENTS

Referring briefly to the prior art spool as shown in FIG. 1, the spool is generally designated 10 and is seen to include a generally cylindrical central hub 12, and a pair of outer flanges 14 and 16. A central flange 18 is provided and extends around the hub 12, but in a discontinuous manner, as shown by the gaps 19.

The central flange 18 divides the spool into two sections 20 and 22. In the past, two separate pieces of nylon monofilament line 24 and 26 were used with the spool. The end 28 of the line 24 is inserted into a hole 30, and the end 32 of line 26 is inserted into hole 34. The lines 24 and 26 were then wound on the spool in opposite directions. The holes 30 and 34 are simply straight holes drilled or molded into the hub. As a result, the line ends inside the hub simply project in whatever manner they are forced by the clutch mechanism on which the spool is mounted, and can often, therefore, interfere with the mounting of the spool or the operation of the clutch.

The natural tendency of the relatively large diameter nylon monofilament is to straighten itself out. When several turns of line are wrapped around each section of the spool, these turns help to resist this natural straightening tendency. But as the line remaining gets shorter, to the point where only a single layer of line remains on the spool, the straightening tendency tends to ease the tension of the line on the spool as it attempts to unwind itself from the spool, with the result that the line ends come out of the holes 30 and 34, and the remaining line must be completely removed and replaced.

As indicated above, this loss of line can often be several feet.

Turning now to the preferred embodiment as shown in FIGS. 2-4, the spool according to the present invention is generally designated 40 and includes a generally cylindrical hub 42 and two outer flanges 44 and 46. A central flange 48 is provided between the two outer flanges 44 and 46 and thus divides the spool into two sections 50 and 52 in which the line may be wound.

The central flange 48 may be discontinuous as shown by the gap 54. Often, it is necessary for the inside of the hub 42 to have one or more projecting ribs 56 for strengthening the hub and/or for engaging the clutch mechanism on which the spool is mounted for locking the spool in place. Such ribs are also discontinuous as shown by the gaps 58.

The central flange 48 preferably is of the same diameter as the outer flanges 44 and 46, however the flange 46 may be of a slightly smaller diameter.

Located at a position of the hub where there is a gap 58 in the ribs 56 but no gap in the flange 48, is an elongated slot 60 formed in the hub. The slot 60 is of a length greater than the thickness of the central flange 48 as seen in FIG. 4, and thus extends in a direction substantially parallel to the axis of rotation of the spool to approximately the midpoint of the sections 50 and 52. This slot can be either molded into the hub when it is made or may be machined in the hub after the spool is molded. The length of the slot is not critical, as long as it extends beyond both sides of the central flange 48 sufficiently to permit the line to be inserted through the slot on both sides of the central flange 48. However, the longer the slot, the greater is the radius of the bend in the nylon line, and therefore the elasticity or straightening force of the line is less, and the line tends to lay flatter in the slot. The width of the slot is approximately the same as the thickness of the line to be used, and in this manner, the line tends to snap into place in the slot 60 and is held securely in place.

In use, the line to be wound on the spool is doubled and the two ends are inserted from the inside of the hub outwardly into the slot so that one end is on each side of the central flange 48 as seen best in FIG. 4. In this manner, the line 62 is retained in the slot 60 by the central flange 48. Since the forces pulling on each end of the line are substantially equal, the line remains in place until it is shortened to a minimum useable length, as short as about two to four inches.

When the line reaches its minimum useable length, the remaining short length of line is simply removed from the spool slot 60 and new line is again inserted into the slot and wound on the spool.

If desired, the slot ends may be angled slightly away from the center of the hub, rather than being straight as shown in FIG. 4. In this manner, the ends of the slot conform closely to the direction in which the line 62 lays in the slot.

It will also be apparent that existing spools of the prior art type such as shown in FIG. 1 and which have the holes 30 and 34 may be modified according to the present invention by the formation of a slot corresponding to slot 60 therein. Such a slot should be formed behind the central flange 18, rather than in the gap 19 as was the case for the holes 30 and 34. In such a case, for example even with a spool which would have otherwise been useless when the space between the holes 30 and 34 became broken.

While this invention has been described as having certain preferred embodiments and features, it will be apparent that it is capable of still further improvements and modifications, and this application is intended to cover all variations and adaptations falling within the spirit of the invention and the scope of the appended claims.

What I claim is:

1. A replacement spool for a rotating line vegetation cutter comprising a central generally cylindrical hub portion, a pair of outer flanges on the outside surface of said hub portion at the ends of said hub portion, a central flange between said outer flanges for dividing said spool into two sections for receiving line wound on said hub in each section, an elongated line receiving slot formed in said hub portion and extending substantially parallel to the longitudinal axis of said hub portion, said elongated slot being positioned on said hub so as to extend beneath said central flange and being of a length such as to extend from approximately the middle of one of said sections to approximately the middle of the other of said sections, and a continuous length of vegetation cutting line wound on said spool in such a manner that one end of said line is wound in one of said sections and the other end of said line is wound in the other of said sections, and a midsection of said line lies in said slot behind said central flange and connects the ends of said line.

2. A replacement spool as in claim 1 and wherein said slot has a width substantially the same as the thickness of said line for holding said line in said slot.

3. A replacement spool as in claim 1 and wherein said central flange is discontinuous around said hub portion.

4. A replacement spool as in claim 3 and wherein said hub has discontinuous ribs formed on the inside surface of said hub portion and said elongated slot is positioned between adjacent ones of said ribs.

5. A replacement spool as in claim 1 and wherein said central flange and said outer flanges have substantially the same outside diameter.

* * * * *